Sept. 8, 1959     H. G. FOWLER     2,903,196
FISHLINE REEL STAND

Filed May 21, 1956     3 Sheets-Sheet 1

INVENTOR.
HERBERT G. FOWLER
BY
*William Frederick Werner*
ATTORNEY

Sept. 8, 1959      H. G. FOWLER      2,903,196
FISHLINE REEL STAND
Filed May 21, 1956      3 Sheets-Sheet 2
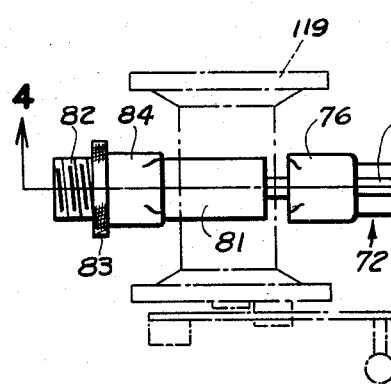
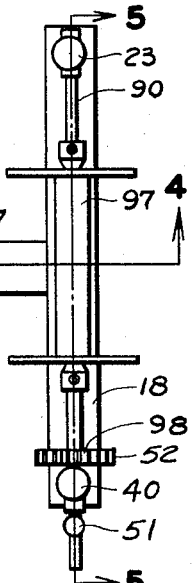
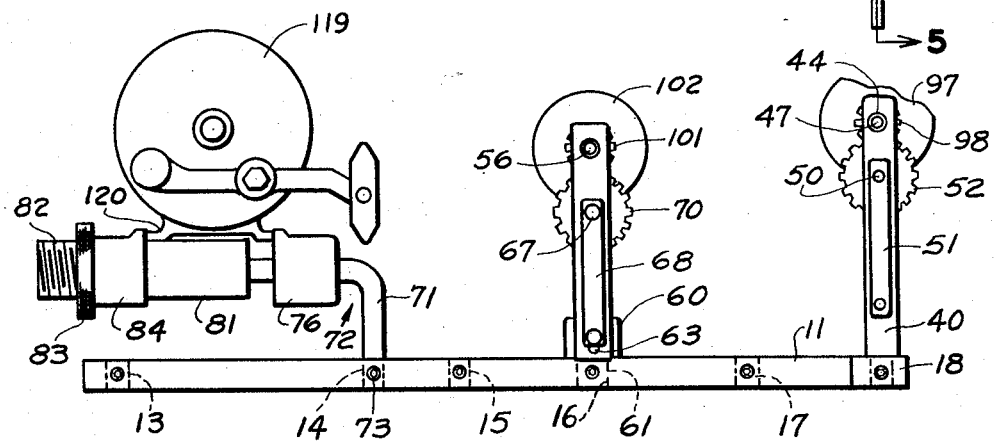
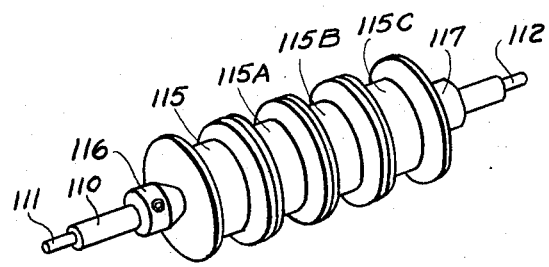
FIG. 2
FIG. 3
FIG. 7
*INVENTOR.*
HERBERT G. FOWLER
BY
*William Frederick Werner*
ATTORNEY

Sept. 8, 1959    H. G. FOWLER    2,903,196
FISHLINE REEL STAND

Filed May 21, 1956    3 Sheets-Sheet 3

*INVENTOR.*
HERBERT G. FOWLER
*BY*
*William Frederick Werner*
ATTORNEY

United States Patent Office 2,903,196
Patented Sept. 8, 1959

2,903,196

FISHLINE REEL STAND

Herbert G. Fowler, Milford, Conn.

Application May 21, 1956, Serial No. 586,215

3 Claims. (Cl. 242—104)

This invention relates to fishline reel stands and more particularly to a stand or frame accommodating a multiple number of reels for the servicing and manipulation of fishline.

One of the objects of the present invention is to provide a frame of several parts which when disassembled will occupy a minimum amount of space and when assembled provides for the instantaneous interchange of spools and reels for the ready servicing and manipulation of fishline including the washing, drying and spool storage thereof.

Another object of the present invention is to provide a frame adapted to accommodate a wide variation of fishline reels and spools from which fishline can be serviced and dried to prevent rotting of the line and the reversing of the fishline on a reel.

Another object of the present invention is to provide a fishline drying reel and frame which is simple in construction, efficient in use and which may be manufactured at a minimum cost of rust proof material.

And still another object of the present invention is to provide a fishline stand and manipulator which is provided with means for securely locking the parts together to form a rigid structure while providing for the rapid interchange of spools and reels and which is readily disassembled into a compact unit.

Other objects of the present invention will become apparent in part and be pointed out in part in the following specification and claims.

In the past fishline drying reels were manufactured in a foldable condition of the reel which rotated on a frame and which could be disassembled into a compact unit. However, all prior art devices and patents were strictly limited to the withdrawal of the fishline from the fishpole reel to a drying reel, the sole object of the devices being to dry the fishline to prevent rot.

With the advent of new materials especially synthetics from which fishline is now fabricated and with the growth in popularity of the sport of fishing; there came a need to provide a means for the servicing, manipulation, interchange and storage of the many different kinds of line the average fisherman acquired in the interest of improving his enjoyment of the sport. The present invention was devised to fulfill this need.

Like reference numerals refer to like parts in the accompanying drawings, in which:

Figure 2 is a plan view of the new and improved fishline reel stand.

Figure 3 is a side elevational view of Figure 2.

Figure 5 is a transverse sectional view taken along line 5—5 of Figure 2.

Figure 7 is a perspective view of a plurality of fishline spools on an interchangeable shaft.

Figure 8 is a perspective view of an interchangeable shaft showing one type of adapter used to hold different types of spool on the interchangeable shaft.

All structural parts are preferably fabricated from aluminum or plastic material.

Figure 1:
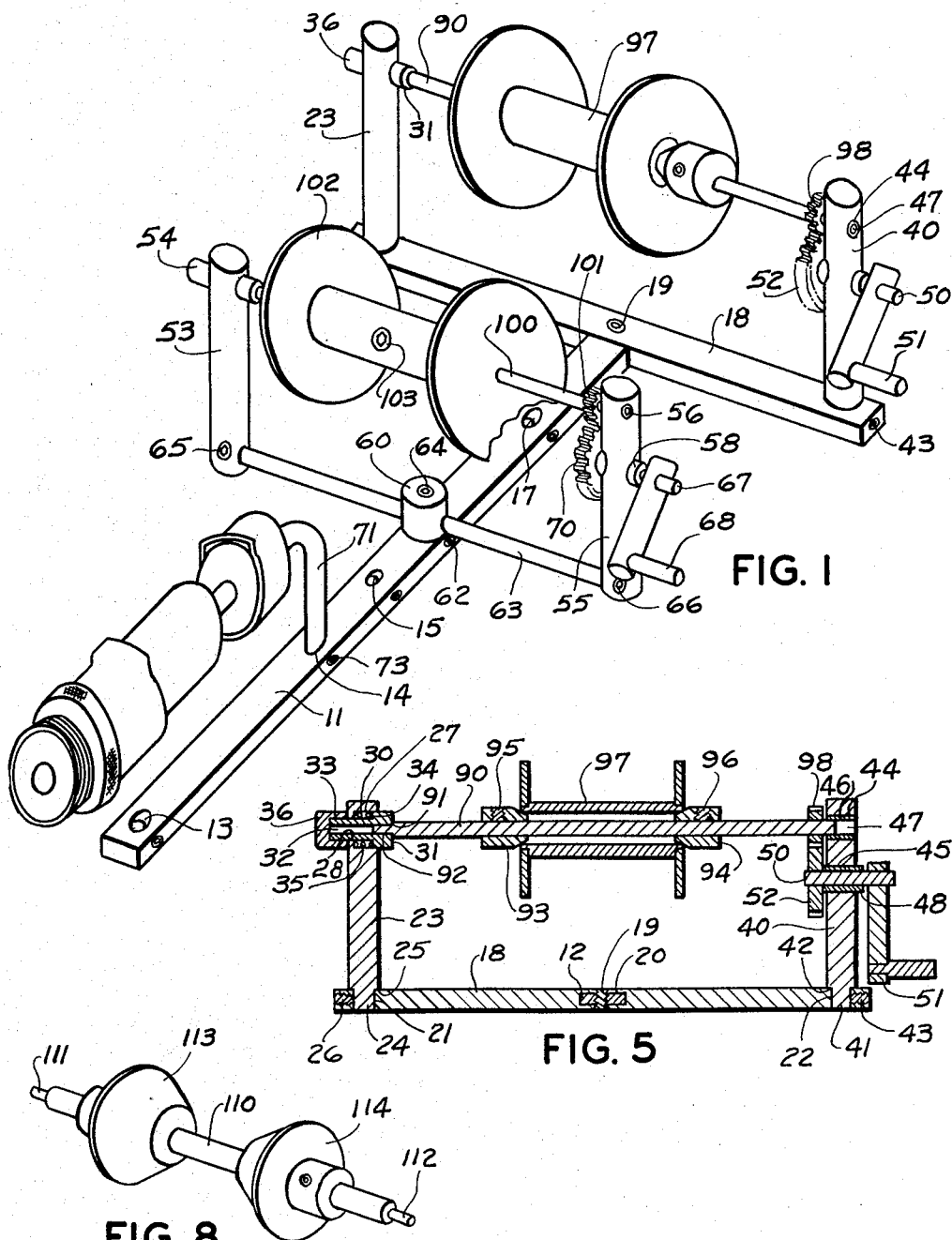
Figure 1 is a perspective view of the new and improved fishline reel stand.
Figure 4:
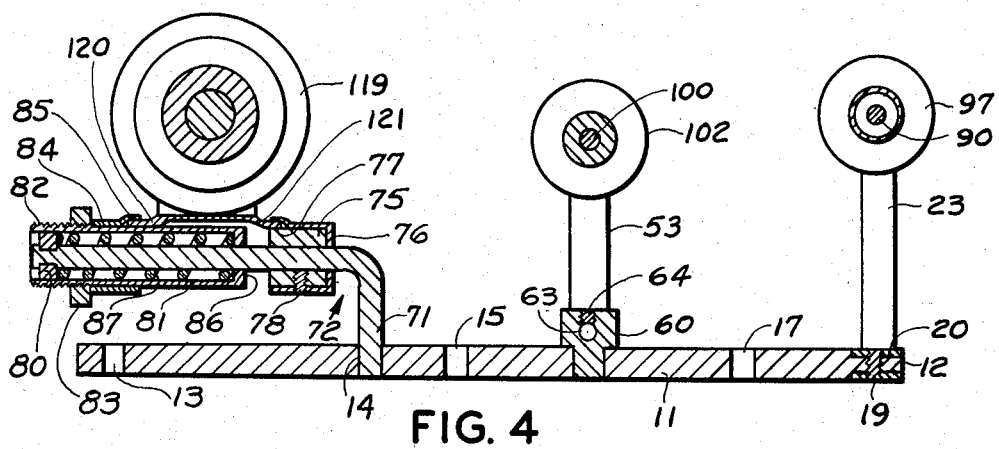
Figure 4 is a longitudinal sectional view taken along line 4—4 of Figure 2.

Referring to the drawings and especially to Figures 1, 4 and 5 a longitudinal bar 11 is provided with a tongue 12 on one end and a plurality of apertures 13, 14, 15, 16 and 17 throughout the length. A transverse bar 18 is provided with a groove 20, adapted to accommodate tongue 12, and two apertures 21 and 22. A set screw 19 may be employed to lock tongue 12 in groove 20 (see Figure 4). A post 23 provided with a reduced end 24 having a shoulder 25 is inserted in aperture 21 and held therein by means of a set screw 26 rotatively mounted in bar 18. A chamber 27 and a bore 28 located in rod 23 have a shoulder 30 formed between them. A plug 31 provided with an axial passageway 32 and a reduced diameter 33 forming a shoulder 34 is slidably mounted in chamber 27 and bore 28 with a coil spring 35 mounted on reduced diameter 33 between shoulders 30 and 34. A cap 36 is secured to plug 31 over reduced diameter 33 as by soldering, sweating, brazing, welding or the like. Thus plug 31, cap 36 and spring 35 form a detent in rod 23 through chamber 27 and bore 28.

A second post 40 provided with a reduced end 41 having a shoulder 42 is inserted in aperture 22 and held therein by means of a set screw 43 rotatively mounted in bar 18. Post 40 is provided with orifices 44 and 45. A bushing 46 provided with an axial passageway 47 is secured in orifice 44. A bushing 48 is fixed in orifice 45. A stub shaft 50 is rotatively mounted in bushing 48 and is provided with a handle 51 on one end and a gear 52 secured thereto on the other end.

A post 53 similar to post 23 is provided with a detent 54. A post 55 similar to post 40 is provided with bushings 56 and 58. A plug 60 provided with a reduced portion 61 (see Figures 3 and 4) adapted to be positioned in any of the plurality of apertures 13 thru 17 is illustrated as being located in aperture 16 and secured therein by means of set screw 62 rotatively mounted in bar 11. A rod 63 is slidably mounted in plug 60 and held in pre-selected position by means of set screw 64 rotatively mounted in plug 60. Rod 63 is secured to post 53 by means of a set screw 65 and to post 55 by means of set screw 66. A shaft 67 provided with a handle 68 on one end and a gear 70 on the other end is rotatively mounted in bushing 58.

A bracket 71 which may be fabricated from aluminum rod is provided with a ninety-degree bend at 72. Bracket 71 is adapted to be placed in any one of the apertures 13 through 17 (see Figures 1, 3 and 4) is illustrated as being located in aperture 14 and secured therein by means of set screw 73. A stop 75 provided with a fixed collar 76 having a mouth 77 is adjustably secured to bracket 71 through set screw 78. A plug 80 is fixed to the free end of bracket 71. A sleeve 81 provided with external threads 82 and an end wall 86 is slidably mounted on plug 80 on one end and on bracket 71 through end wall 86 on the other end. A lock washer 83 is rotatively mounted on threads 82. A collar 84 provided with a mouth 85 is slidably mounted on sleeve 81. A coil spring 87 is located within sleeve 81 and is interposed between plug 80 and end wall 86. Sleeve 81 thus becomes a detent carrying a loose collar 84 which may be held in position by lock washer 83.

A shaft 90 is provided with a shoulder 91 and a reduced portion 92. Two adapters 93 and 94 are slidably mounted on shaft 90 and are held in selected position by means of set screws 95, 96 respectively. A spool 97 is held in pre-selected position on shaft 90 to rotate with shaft 90 through adapters 93 and 94 which grip spool 97 between them. A pinion 98 may be fixed to shaft 90. Pinion 98 may engage gear 52 to be rotated by gear 52 through handle 51 to rotate shaft 90 and spool 97. One end of shaft 90 is rotatively mounted in axial passageway 47. Reduced portion 92 of shaft 90 is rotatively mounted in axial passageway 32 with shoulder 91 abutting the end of plug 31.

Similarly a shaft 100 having a pinion 101 fixed to one end is rotatively mounted in bushing 56 and detent 54. A spool 102 may be fixed to shaft 100 by means of set screw 103. Pinion 101 engages to be rotated by gear 70.

Figure 6:
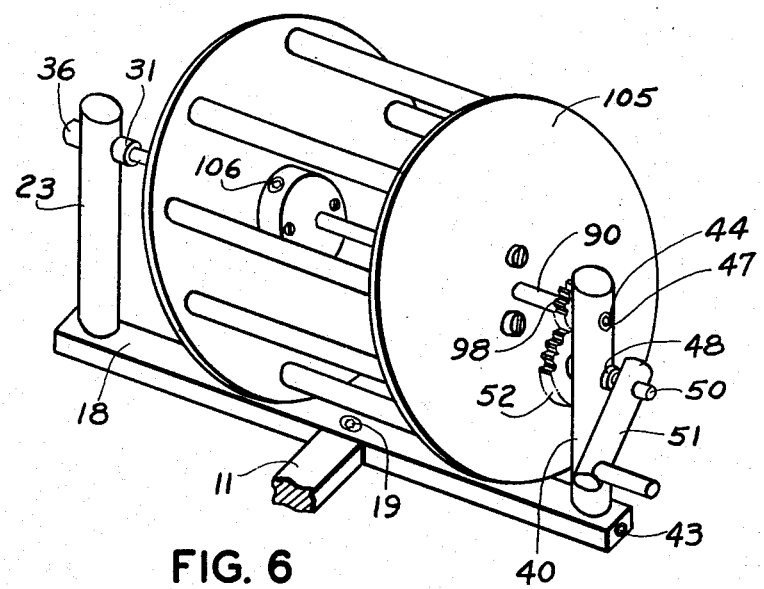
Figure 6 is a fragmentary perspective view showing a drying reel.

Referring to Figure 6, wherein shaft 90 may have a cage or drying drum 105 secured thereto by means of set screw 106 in place of spool 97. Adapters 93, 94 which may or may not be used as the circumstances require drying drum 105 to be held fast to shaft 90.

Figure 8 depicts a shaft 110 provided with opposite ends 111 and 112 adapted to be rotatively mounted in axial passageways 32, 47 respectively or in detent 54 and bearing 56 respectively, for purposes which will presently appear. Shaft 110 may be provided with adapters 113, 114 having a shape different from the adapters 93, 94 but serving the same purpose, namely, that of holding a spool to shaft 110. A pinion similar to pinions 98 or 101 may or may not be fixed to shaft 110 as will presently appear.

Figure 7 depicts shaft 110 provided with a plurality of spools 115, 115A, 115B, 115C. Said spools are held on shaft 110 by means of adapters 116, 117.

In operation a fisherman will take the reel 119 from his fish pole and place the reel bracket or tongue 120 in mouth 85 forcing loose collar 84 against lock washer 83 and thereby cause sleeve 81 to compress spring 87 until sleeve 81 moves sufficiently far away from stop 75 to allow the opposite end of the reel bracket or tongue 121 to engage mouth 77. Spring 87 will force sleeve 77 toward stop 75. Lock nut 83 can be turned to adjust loose sleeve 84 into position to securely hold tongues 120, 121 in mouths 85, 77. The fish line on reel 119 may be fastened to spool 102. By turning handle 68 the line will be wound on spool 102. When all the line is on spool 102, shaft 100 can be urged to actuate detent 54 to allow the end of shaft 100 to be withdrawn from bushing 56 so that the spool can be stored away until the particular size and type of fish line is again wanted on reel 119.

Shaft 110 (Figure 7) may be inserted in axial passageways 32 and 47 so that the line on spools 115, 116A etc., can be freely wound on reel 119. After reel 119 is used for fishing, shaft 90 may be provided with drying drum 105. The line may be wound upon drying drum 105 by turning handle 51. The line can then be washed free of salt water or dirt and left to dry. When dry the line can be wound on spool 102 for storage.

Many other examples of the interchange of line on various spools could be given. Suffice it to say that in the hands of sportsmen the present device will lend itself to a wide range of spool and line manipulation.

Having shown and described a preferred embodiment of the present invention, by way of example, but realizing that structural changes could be made and other examples given without departing from either the spirit or scope of this invention.

What I claim is:

1. A fish line reel stand consisting of a longitudinal bar provided with a plurality of apertures throughout its length, a transverse bar, means to removably secure said longitudinal bar to said transverse bar, a post provided with a first detent removably secured in one end of said transverse bar, a second post provided with two bearings removably secured in the opposite end of said transverse bar, a stub shaft provided with a gear on one end and a handle on the opposite end, rotatively mounted in one of said two bearings, a bracket, means to removably secure said bracket in any one of said plurality of apertures, a stop having a fixed collar provided with a mouth, adjustably fixed to said bracket, a second detent provided with an adjustable collar having a mouth, secured to said bracket, said mouths facing each other to accommodate a fishing reel bracket, a spool, a shaft provided with a reduced end adapted to rotatively engage said first detent, the other end of said shaft rotatively mounted in the second of said two bearings, a pinion fixed to said shaft and engageable with said gear, to be rotated thereby through said handle, said spool fixed to said shaft.

2. A stand as defined in claim 1 being further characterized in that, a plug is provided to be removably secured in any one of said plurality of apertures, a rod adjustably fixed in said plug, a third post provided with a third detent removably secured to one end of said rod, a fourth post provided with two bearings removably secured to the opposite end of said rod, a second stub shaft provided with a second gear on one end and a handle on the opposite end rotatively mounted in one of said two bearings in said fourth post, a second spool, a second shaft provided with a reduced end adapted to rotatively engage said third detent, the other end of said second shaft rotatively mounted in the second of said two bearings in said fourth post, a pinion fixed to said second shaft and engageable with said second gear to be rotated thereby through said handle, said second spool fixed to said last mentioned shaft to be rotated thereby.

3. A fish line reel stand consisting of a longitudinal bar having a tongue formed in one end, a transverse bar provided with a groove to accommodate said tongue and provided with two apertures, one on each end of its length, a set screw in said transverse bar opposite each aperture, a set screw in said transverse bar removably securing said tongue in said groove, a first post provided with a reduced end removably secured by a set screw in one of said two apertures in said transverse bar, a chamber and a bore in said first post, a shoulder at the juncture of said chamber and bore, a plug provided with an axial passageway and a reduced diameter slidably mounted in said chamber and bore, a shoulder at the juncture of said reduced diameter and outside diameter of said plug, a cap secured to the end of said reduced diameter, a spring located in said chamber and engaging to urge said first mentioned shoulder from said second mentioned shoulder, a second post provided with two bearings and a reduced end removably secured by a set screw in the second of said two apertures in said transverse bar, a stub shaft rotatively mounted in one of said bearings, a gear secured to one end of said stub shaft, a handle secured to the other end of said stub shaft, a shaft provided with a reduced end adapted to rotatively engage said axial passageway and to be resiliently engaged by said plug, the other end of said shaft having a pinion fixed thereto and rotatively engaging the other of said two bearings with said pinion engaging said gear to be rotated thereby, a spool, two adapters adjustably secured to said shaft, said adapters securing said spool to said shaft to be rotated thereby.

References Cited in the file of this patent

UNITED STATES PATENTS

| | | |
|---|---|---|
| 531,938 | Heston | Jan. 1, 1895 |
| 785,052 | Seep | Mar. 14, 1905 |
| 877,200 | Keefe | Jan. 21, 1908 |
| 965,648 | Nace | July 26, 1910 |
| 1,393,695 | Paulus | Oct. 11, 1921 |
| 1,517,720 | Fish | Dec. 2, 1924 |
| 1,817,168 | Sauer | Aug. 4, 1931 |
| 2,129,916 | Erickson | Sept. 13, 1938 |
| 2,445,534 | Musso | July 20, 1948 |